United States Patent
Ofuji et al.

(10) Patent No.: US 8,000,296 B2
(45) Date of Patent: Aug. 16, 2011

(54) BASE STATION AND MOBILE STATION

(75) Inventors: Yoshiaki Ofuji, Yokohama (JP); Kenichi Higuchi, Saitama (JP); Mamoru Sawahashi, Yokohama (JP)

(73) Assignee: NTT Docomo, Inc., Tokyo (JP)

( * ) Notice: Subject to any disclaimer, the term of this patent is extended or adjusted under 35 U.S.C. 154(b) by 0 days.

(21) Appl. No.: 13/041,139

(22) Filed: Mar. 4, 2011

(65) Prior Publication Data

US 2011/0149896 A1 Jun. 23, 2011

Related U.S. Application Data

(63) Continuation of application No. 12/438,290, filed as application No. PCT/JP2007/066052 on Aug. 17, 2007.

(30) Foreign Application Priority Data

Aug. 22, 2006 (JP) .................................. 2006-225927

(51) Int. Cl.
   *H04J 4/00* (2006.01)
   *H04J 3/16* (2006.01)
(52) U.S. Cl. ........ 370/330; 370/348; 370/436; 370/437; 370/462; 455/447; 455/450
(58) Field of Classification Search .................. 370/330, 370/348, 436, 437, 462; 455/447, 450, 553.1, 455/422.1, 436, 434; 375/260, 295
See application file for complete search history.

(56) References Cited

U.S. PATENT DOCUMENTS

| | | | | |
|---|---|---|---|---|
| 5,757,854 A * | 5/1998 | Hunsinger et al. | ............ | 375/260 |
| 7,505,685 B2 * | 3/2009 | Takanashi et al. | ............ | 398/32 |
| 7,526,035 B2 * | 4/2009 | Suh et al. | .................... | 375/260 |
| 7,551,546 B2 * | 6/2009 | Ma et al. | ........................ | 370/208 |
| 7,573,851 B2 * | 8/2009 | Xing et al. | ..................... | 370/334 |
| 7,729,313 B2 * | 6/2010 | Lee et al. | ....................... | 370/331 |
| 7,729,329 B2 * | 6/2010 | Fujita et al. | ..................... | 370/342 |
| 7,813,701 B2 * | 10/2010 | Strong et al. | .................. | 455/63.1 |
| 7,848,438 B2 * | 12/2010 | Baum et al. | .................... | 375/260 |
| 7,860,150 B2 * | 12/2010 | Tiirola et al. | .................. | 375/135 |
| 2001/0012283 A1 * | 8/2001 | Miya et al. | ..................... | 370/342 |
| 2003/0087606 A1 * | 5/2003 | Dybdal et al. | ............... | 455/67.1 |

(Continued)

FOREIGN PATENT DOCUMENTS

EP      1786115 A1 *   5/2007

(Continued)

OTHER PUBLICATIONS

Optimal Resource Allocation for Pilot Symbol Aided Multiuser Receivers in Rayleigh Faded CDMA Channels Jamie S. Evans, IEEE Transactions on Communications, vol. 50, No. 8, Aug. 2002.*

(Continued)

*Primary Examiner* — Salman Ahmed
(74) *Attorney, Agent, or Firm* — Osha • Liang LLP

(57) ABSTRACT

One aspect of the present invention relates to a base station wherein either resource blocks resulting from division of a system bandwidth into blocks of consecutive frequency subcarriers or distributed type resource blocks consisting of frequency subcarriers discretely distributed within the system bandwidth and resulting from segmentation of the resource blocks into multiple resource blocks are assigned to mobile stations, the base station including: a scheduling unit configured to assign either the resource blocks or the distributed type resource blocks to the mobile stations at a predefined assignment cycle based on respective downlink reception channel states transmitted from the mobile stations.

7 Claims, 14 Drawing Sheets

U.S. PATENT DOCUMENTS

| | | | |
|---|---|---|---|
| 2004/0174812 A1* | 9/2004 | Murakami et al. | 370/215 |
| 2005/0238108 A1* | 10/2005 | Suh et al. | 375/260 |
| 2005/0238109 A1* | 10/2005 | Koga et al. | 375/260 |
| 2005/0286482 A1* | 12/2005 | Rajkotia | 370/342 |
| 2006/0120395 A1* | 6/2006 | Xing et al. | 370/431 |
| 2006/0146856 A1* | 7/2006 | Jung et al. | 370/431 |
| 2006/0198455 A1* | 9/2006 | Fujii et al. | 375/260 |
| 2006/0291583 A1* | 12/2006 | Hammerschmidt et al. | 375/295 |
| 2007/0004465 A1* | 1/2007 | Papasakellariou et al. | 455/571 |
| 2007/0070956 A1* | 3/2007 | Seki | 370/335 |
| 2007/0076804 A1* | 4/2007 | Sestok et al. | 375/260 |
| 2007/0091787 A1* | 4/2007 | Kwon et al. | 370/208 |
| 2007/0098093 A1* | 5/2007 | Kwon et al. | 375/260 |
| 2007/0115796 A1* | 5/2007 | Jeong et al. | 370/203 |
| 2007/0189404 A1* | 8/2007 | Baum et al. | 375/260 |
| 2007/0223611 A1* | 9/2007 | Ode et al. | 375/260 |
| 2007/0253370 A1* | 11/2007 | Khan et al. | 370/331 |
| 2007/0254693 A1* | 11/2007 | Furukawa | 455/553.1 |
| 2008/0039066 A1* | 2/2008 | Laroia et al. | 455/422.1 |
| 2008/0146231 A1* | 6/2008 | Huang et al. | 455/436 |
| 2008/0227448 A1* | 9/2008 | Kim et al. | 455/434 |
| 2008/0239938 A1* | 10/2008 | Jalloul et al. | 370/260 |
| 2008/0287130 A1* | 11/2008 | Laroia et al. | 455/436 |
| 2009/0147748 A1* | 6/2009 | Ofuji et al. | 370/330 |
| 2009/0175228 A1* | 7/2009 | Kimura et al. | 370/329 |
| 2009/0220021 A1* | 9/2009 | Ihm et al. | 375/267 |
| 2009/0310549 A1* | 12/2009 | Higuchi et al. | 370/329 |
| 2010/0157913 A1 | 6/2010 | Nagata et al. | |
| 2010/0157937 A1* | 6/2010 | Muharemovic et al. | 370/330 |
| 2010/0177715 A1 | 7/2010 | Ofuji et al. | |
| 2010/0220607 A1* | 9/2010 | Fujishima et al. | 370/252 |
| 2010/0232374 A1* | 9/2010 | Ofuji et al. | 370/329 |

FOREIGN PATENT DOCUMENTS

| | | |
|---|---|---|
| EP | 1 848 233 A1 | 10/2007 |
| JP | 2004-312291 A | 11/2004 |
| JP | 2006-050545 A | 2/2006 |
| JP | 4519817 | 5/2010 |
| WO | WO 02093859 A1 * | 11/2002 |
| WO | 2006/085353 A1 | 8/2006 |

OTHER PUBLICATIONS

Uplink VoIP Support for 3GPP EUTRA; Nory et al.; 2007 IEEE.*
Jin Xinzhu, Channel Estimation Techniques of SC-FDMA, Master's Thesis 2007.*
Japanese Office Action for Application No. 2010-090343, mailed on Jun. 29, 2010 (5 pages).
CATT: "Proposals for the uplink scheduling", 3GPP TSG-RAN WG2 ad-hoc on Lte, R2-061900, Jun. 27, 2006, URL http://www.3gpp.org/ftp/tsg_ran/WG2_RL2/TSGR2_AHs/2006_06_LTE/Docs/ R2-061900.zip.
NTT DOCOMO, Inc. "Persistent Scheduling", 3GPP TSG-RAN WG2 ad-hoc on Lte, R2-061920, Jun. 27, 2006, URL http://www.3gpp.org/ftp/tsg_ran/WG2_RL2/TSGR2_AHs/2006_06_LTE/Docs/ R2-061920.zip.
Motorola, "EUTRA SC-FDMA Uplink Resource Block, Resource Allocation and Pilot/Reference Signal Design & TP," 3GPP TSG RAN1 LTE Ad Hoc, Jan. 26, 2006, R1-060246 (18 pages).
S. Nagata, et al., "OFDMA o Mochiiru Evolved UTRA ni Okeru Kyoyu Data Channel ni Taisuru Block Bunkatsu o Mochiiru Resource Block Level no Distributed Soshin Hoho" (Block-Wise Resource Block-Level Distributed Transmission for Shared Data Channel in OFDMA-Based Evolved UTRA Downlink), Technical Report of IEICE RCS2006-101 (Jul. 2006), vol. 106, No. 168, pp. 251-256 (8 pages).
International Search Report issued in PCT/JP2007/066052, mailed on Nov. 13, 2007, with translation (11 pages).
Written Opinion issued in PCT/JP2007/066052, mailed on Nov. 13, 2007 (5 pages).
Ericsson, R1-060099, "Persistent Scheduling for E-UTRA," TSG-RAN WG1 LTE AdHoc, Helsinki, Finland, Jan. 23-25, 2006 (2 pages).
Japanese Office Action for Application No. 2006-225927, mailed on Mar. 30, 2010 (5 pages).
3rd Generation Partnership Project; Technical Specification Group Radio Access Network; Physical layer aspects for evolved Universal Terrestrial Radio Access (UTRA) (Release 7), 3GPP Standard; 3GPP TR 25.814, 3rd Generation Partnership Project (3GPP), Mobile Competence Centre ; 650, Route Des Lucioles ; F-06921 Sophia-Antipolis Cedex ; France, No. V7.0.0, Jun. 1, 2006, pp. 1-126, XP050369160.
Japanese Office Action for Application No. 2010-020228, mailed on Mar. 8, 2011 (3 pages).
Motorola: "R1-061734 Scheduling for Voice", 3GPP TSG RAN WG1 LTE AdHoc, Jun. 20, 2006, pp. 1-11, Cannes Retrieved from the Internet: <URL:http://www.3gpp.org/ftp/tsg_ran/wg1_rl1/TSGR1_AH/LTE_AH_June-06/Docs/R1-061734.zip> [retrieved on Dec. 15, 2010].
esp@cenet Patent Abstract for Japanese Publication No. 2008053865, publication date Mar. 6, 2008. (1 page).
Qualcomm Europe: "Considerations for control signaling support of Real Time Services", 3GPP Draft; R1-060173,3rd Generation Partnership Project (3GPP), Mobile Competence Centre; 650, Route Des Lucioles ; F-06921 Sophia-Antipolis Cedex ; France, vol. RAN WG1, no. Helsinki, Finland; 200601 19, Jan. 19, 2006, XP050111308, [retrieved on Jan. 19, 2006].
NTT DOCOMO et al: "LI/L2 Control Channel Structure for E-UTRA Downlink", 3GPP Draft; R1-061544 DL L1 L2 Control Channel, 3rd Generation Partnership Project (3GPP), Mobile Competence Centre ; 650, Route Des Lucioles ; F-06921 Sophia-Antipolis Cedex ; France, vol. RAN WG1, no. Shanghai, China; 20060505, May 5, 2006, XP050102393, [retrieved on May 5, 2006].
Philips: "Mapping between higher-layer PDUs and resource blocks in EUTRA", 3GPP Draft; R1-060556,3rd Generation Partnership Project (3GPP), Mobile Competence Centre ; 650, Route Des Lucioles ; F-06921 Sophia-Antipolis Cedex ; France, vol. RAN WG1, no. Denver, USA; 20060209, Feb. 9, 2006, XP050101492, [retrieved on Feb. 9, 2006].
Ericsson et al: "E-UTRA Downlink Control Signaling—Overhead Assessment", 3GPP Draft; R1-060573,3rd Generation Partnership Project (3GPP), Mobile Competence Centre; 650, Route Des Lucioles ; F-06921 Sophia-Antipolis Cedex ; France, vol. RAN WG1 , no. Denver, USA; 20060209, Feb. 9, 2006, XP050101509, [retrieved on Feb. 9, 2006].
LG Electronics: "Uplink pilot for channel quality measurement", 3GPP Draft; R1-060919-Uplink CQ Pilot-With TP, 3rd Generation Partnership Project (3GPP), Mobile Competence Centre ; 650, Route Des Lucioles ; F-06921 Sophia-Antipolis Cedex ; France, vol. RAN WG1, no. Athens, Greece; 20060321,Mar. 21, 2006, XP050101825, [retrieved on Mar. 21, 2006].
Texas Instruments: "On Allocation of Uplink Pilot Sub-channels in EUTRA SC-FDMA", 3GPP Draft; R1-050822-UL Pilot, 3rd Generation Partnership Project (3GPP), Mobile Competence Centre ; 650, Route Des Lucioles ; F-06921 Sophia-Antipolis Cedex ; France, vol. RAN WG1, no. London, UK; 20050825,Aug. 25, 2005, XP050100452, [retrieved on Aug. 25, 2005].
Extended European Search Report for Application No. 07792668.1, mailed on Dec. 28, 2010 (14 pages).
US Office Action issued in U.S. Appl. No. 12/438,290, mailed Jan. 13, 2011, 8 pages.

* cited by examiner

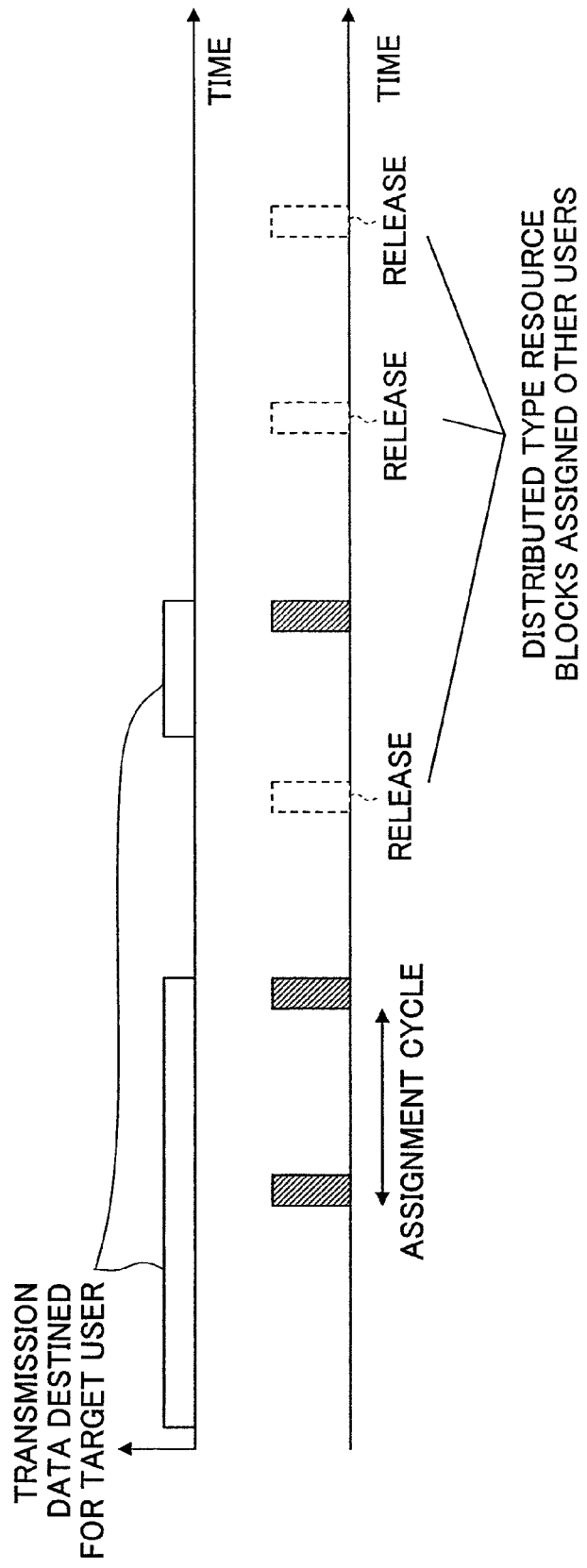

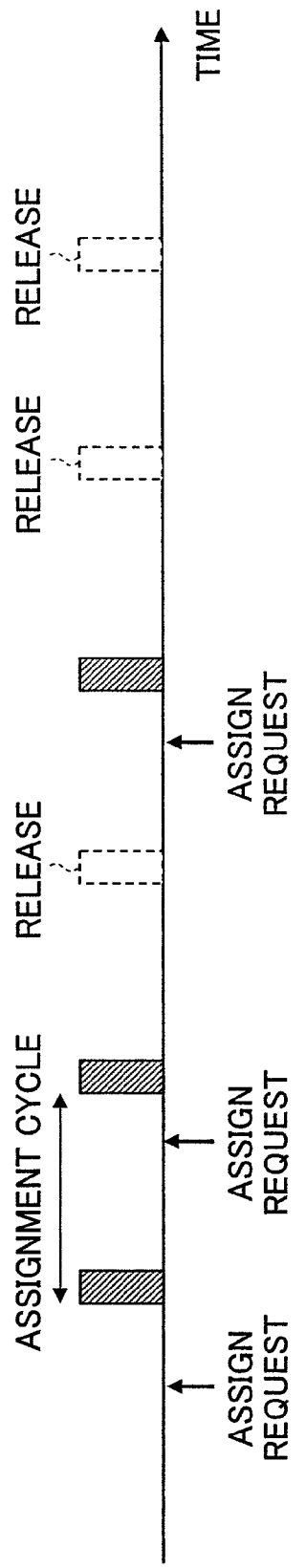

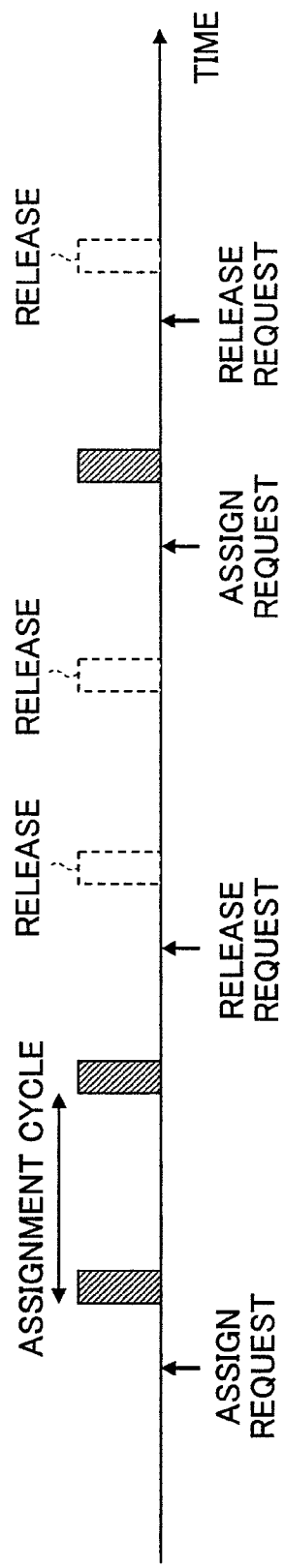

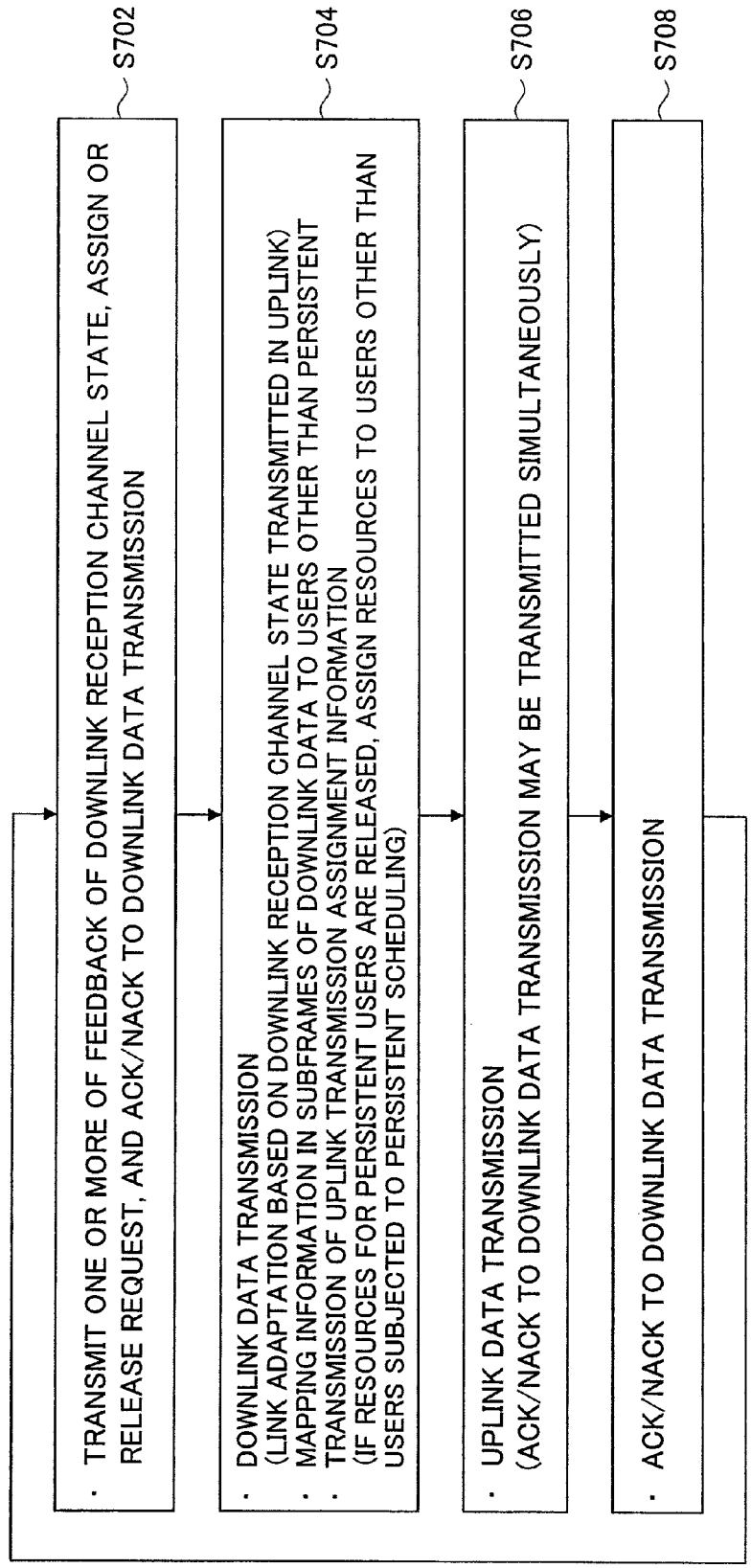

BASE STATION AND MOBILE STATION

CROSS-REFERENCE TO RELATED APPLICATIONS

This is a continuation application of U.S. patent application Ser. No. 12/438,290 filed Feb. 20, 2009, which is a national stage application of PCT/JP2007/066052, which claims priority to JP2006/225927.

TECHNICAL FIELD

The present invention relates to LTE (Long Term Evolution) systems and more particularly to base stations and mobile stations.

BACKGROUND ART

In fast packet scheduling where for each transmission slot or each resource block (RB) resulting from division of a frequency band of the transmission slot, transmissions are assigned to users based on reception channel states, high frequency utilization efficiency can be achieved.

In order to realize the fast packet scheduling, however, assignment information must be transmitted for each transmission slot or each resource block from a base station to user terminals, and states of transmission paths must be fed back from the user terminals to the base station, which may increase signaling overhead.

DISCLOSURE OF INVENTION

Problem to be Solved by the Invention

It may be difficult to apply the above-stated fast packet scheduling to some traffic where packets with a virtually fixed size occur at a constant cycle, such as audio services, and a severe requirement against delay is set. For such traffic, even if data is to be transmitted under an unsatisfactory reception state, it is unacceptable to wait for the transmission until the reception state becomes better, for example. Thus, the demand may occur for the traffic to which radio resources may be assigned in a fixed manner at a constant cycle without consideration of the reception state.

Hence, persistent scheduling is proposed to periodically assign predefined radio resources to traffic where data may periodically occur such as VoIP, as described in Ericsson, R1-060099 "Persistent Scheduling for E-UTRA" TSG-RAN WG1 LTE AdHoc, Helsinki, Finland, Jan. 23-25, 2006.

However, this proposal is concept based and no specific arrangement of a base station and a mobile station has been proposed.

Thus, one object of the present invention is to provide a base station and a mobile station that can periodically assign predefined radio resources to traffic where data may periodically occur.

Means for Solving the Problem

In order to overcome the above problem, one aspect of the present invention relates a base station wherein either resource blocks resulting from division of a system bandwidth into blocks of consecutive frequency subcarriers or distributed type resource blocks consisting of frequency subcarriers discretely distributed within the system bandwidth and resulting from segmentation of the resource blocks into multiple resource blocks are assigned to mobile stations, the base station including: a scheduling unit configured to assign either the resource blocks or the distributed type resource blocks to the mobile stations at a predefined assignment cycle based on respective downlink reception channel states transmitted from the mobile stations.

According to this configuration, it is possible to assign radio resources to a mobile station statically or in a fixed manner at a predefined cycle.

Another aspect of the present invention relates to a base station, including: a pilot channel transmission band assignment unit configured to assign a transmission band of a pilot channel to measure an uplink reception channel state at a cycle longer than an assignment cycle of a data channel; a data channel transmission band assignment unit configured to assign resource blocks as a transmission band of the data channel to mobile stations, the resource blocks resulting from division of a system bandwidth into blocks of consecutive frequency subcarriers; and a control information generation unit configured to generate a control signal to inform the mobile stations of a transmission bandwidth of the pilot channel and a transmission bandwidth of the data channel, the transmission bandwidths being determined for the assignment, wherein the data channel transmission band assignment unit is configured to assign the transmission band of the data channel based on reception quality of the pilot channel.

According to this configuration, it is possible to assign a transmission band of a pilot channel to measure an uplink reception channel state at a cycle longer than an assignment cycle of a data channel and determine assignment of a transmission band of the data channel to mobile stations based on the reception quality of the pilot channel.

Another aspect of the present invention relates to a mobile station, including: a pilot signal generation unit configured to use a frequency band assigned by a base station to generate a pilot channel for the base station at a cycle longer than an assignment cycle of a data channel; and a transmission data assignment unit configured to assign transmission data to a resource block determined in the base station based on the pilot channel at a predefined assignment cycle.

According to this configuration, it is possible to use a frequency band assigned by a base station to generate the pilot channel for the base station at a cycle longer than an assignment cycle of a data channel and assign transmission data to an assigned resource block determined in the base station based on the pilot channel at a predefined assignment cycle.

Advantage of the Invention

According to the embodiments of the present invention, a base station and a mobile station can be realized for periodically assigning predefined radio resources to traffic where data may periodically occur.

BRIEF DESCRIPTION OF DRAWINGS

FIG. 5 is a schematic diagram illustrating release of resource blocks in a downlink according to one embodiment of the present invention;

FIG. 6A is a schematic diagram illustrating release of resource blocks in an uplink according to one embodiment of the present invention;

FIG. 6C is a schematic diagram illustrating release of resource blocks in an uplink according to one embodiment of the present invention;

FIG. 7B is a schematic diagram illustrating transmission timings of data and control information according to one embodiment of the present invention;

LIST OF REFERENCE SYMBOLS

100: base station
200: mobile station

BEST MODE FOR CARRYING OUT THE INVENTION

The best mode of implementing the present invention is described through the following embodiments with reference to the drawings.

Throughout all the drawings illustrating the embodiments, components and elements having the same function are referred to as the same reference symbols and are not described repeatedly.

A mobile communication system according to this embodiment includes a base station 100 and a mobile station 200. The base station 100 and the mobile station 200 periodically assign the mobile station 200 and the base station 100, respectively, predefined radio resources to traffic where data periodically may occur.

As stated above, in the fast packet scheduling for frequency areas to which the base station 100 assigns resource blocks to the mobile station 200 based on frequency selectivity and reception channel state, there may be increases in L1/L2 control signaling such as transmissions of assignment information for resource blocks to the mobile station 200 and feedback of the reception channel state from the mobile station 200.

Since the main purpose of the persistent scheduling is to reduce the L1/L2 control signaling, the following transmission method, for which frequency diversity effect can be expected, is applicable to the persistent scheduling applied to the mobile communication system according to this embodiment. As stated above, the persistent scheduling is a scheduling method for periodically assigning predefined radio resources to traffic where data periodically may occur.

For downlinks, OFDMA (Orthogonal Frequency Division Multiple Access) is applied. The OFDMA is a scheme where data is transmitted over multiple narrower frequency bands (subcarriers) resulting from division of a frequency band. Since the subcarriers partially overlap with each other on frequency but can be densely arranged without mutual interference, it is possible to realize faster transmission and improve frequency utilization efficiency.

Figure 1:
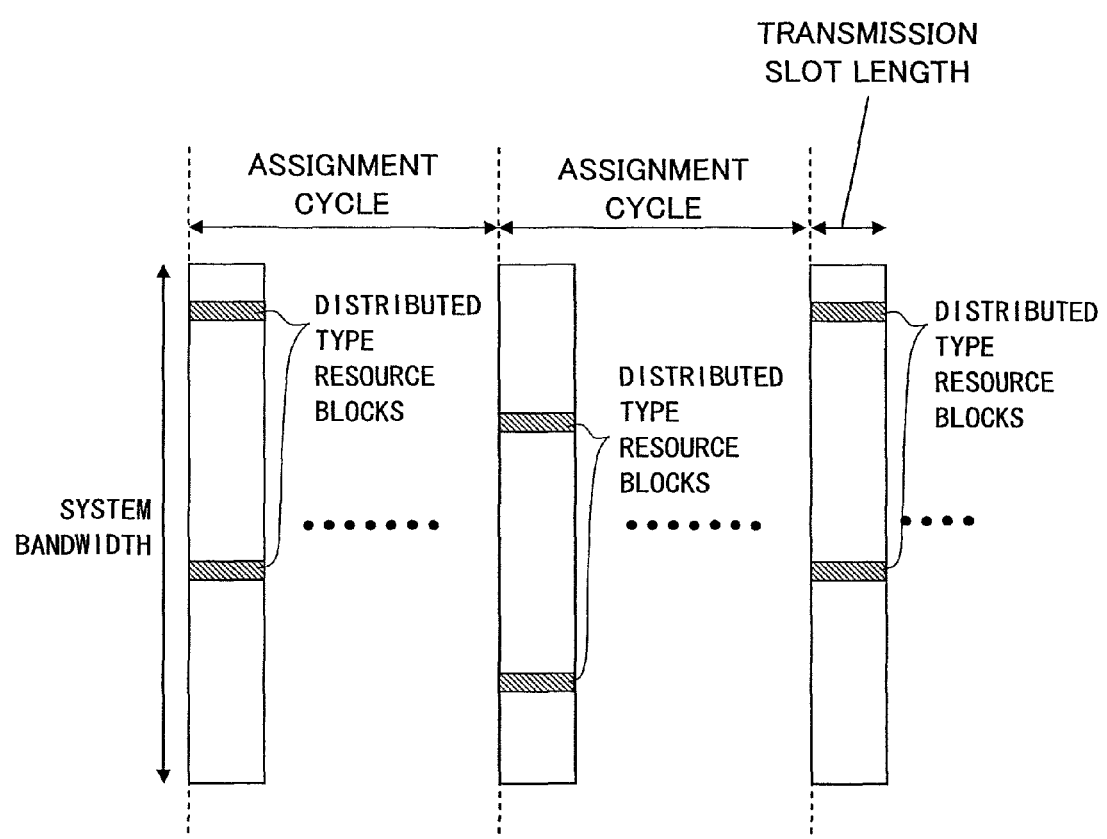
FIG. 1 is a schematic diagram illustrating a downlink transmission method according to one embodiment of the present invention.

In addition, a distributed transmission scheme at the resource block level where block division is performed is conducted in the downlinks. Specifically, as illustrated in FIG. 1, each user is assigned distributed type resource blocks. The distributed resource blocks are arranged by segmenting resource blocks (block segmentation) that consist of discretely distributed frequency subcarriers within a system bandwidth and result from division of the system bandwidth into several consecutive frequency subcarriers. The distributed type resource blocks are assigned in a distributed manner within a single transmission slot. The distributed type resource blocks are assigned at the resource block level, that is, in units of the resource block. In the downlinks, instead of the above-stated distributed type resource blocks, each user may be assigned resource blocks resulting from division of the system bandwidth into blocks of consecutive frequency subcarriers.

FIG. 1 illustrates an exemplary resource block arrangement consisting of two distributed type resource blocks. The same distributed type resource blocks may be assigned for a predefined assignment cycle, or different distributed type resource blocks may be assigned for different assignment cycles. The frequency diversity effect may be achieved by modifying the distributed type resource blocks for different assignment cycles. The term assignment cycle used herein means a cycle where the distributed type resource blocks are assigned to a user. The assignment cycle may depend on data types, and for example, in VoIP (Voice over Internet Protocol), the assignment cycle may be 20 ms similar to a packet transmission interval.

In this transmission method, if AMC (Adaptive Modulation and Coding) for adaptively adjusting modulation schemes and error correction coding rates depending on variations of propagation environment in downlinks is applied, the mobile station 200 has to feed back only a reception channel state averaged over a frequency area. As a result, transmissions may be conducted in the base station 100 to achieve the frequency diversity effect based on only temporal variations of the reception channel state averaged over the whole band.

SC-FDMA (Single-Carrier Frequency Division Multiple Access) is applied to uplinks. The SC-FDMA is a transmission scheme that enables reduction in interference between several terminals by using different frequency bands among the terminals for transmission.

Figure 2:
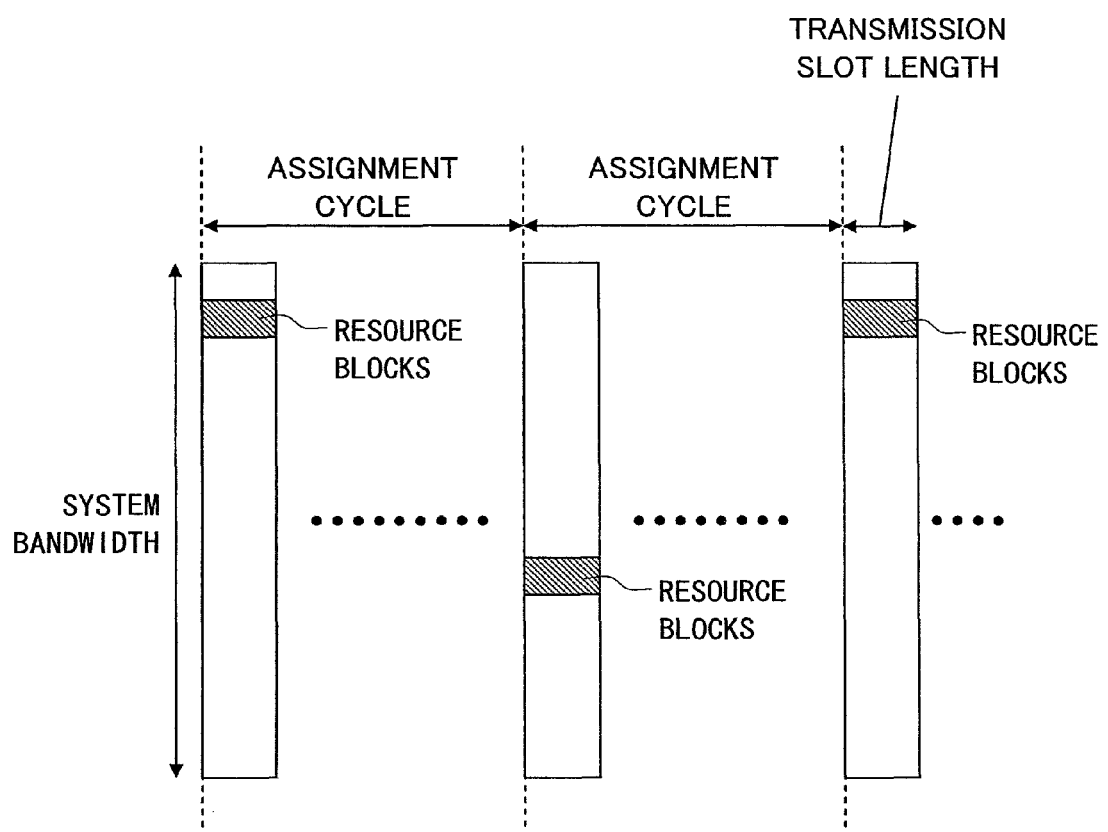
FIG. 2 is a schematic diagram illustrating an uplink transmission method according to one embodiment of the present invention.

In addition, as illustrated in FIG. 2, a localized transmission method that uses frequency hopping is applied to the uplinks. Specifically, resource blocks resulting from division of a system bandwidth of blocks of consecutive frequency subcarriers are assigned to mobile stations at a predefined assignment cycle and are subjected to the frequency hopping, and thereby the frequency diversity effect may be achieved. The term frequency hopping used herein means that assigned resource blocks are changed for each transmission slot. Also, the term assignment cycle used herein means a cycle where resource blocks are assigned to users. The assignment cycle may depend on data types, and be equal to 20 ms, for example, in the VoIP, similar to packet transmission cycle.

Next, an exemplary transmission method for achieving a temporal diversity effect is described.

If HARQ (Hybrid Automatic Repeat Request), a combination of the ARQ and the error correction coding, is applied, signaling for performing the HARQ is required, resulting in an increase in signaling overhead.

For example, if an asynchronous type of HARQ is applied, transmission slots or resource blocks must be dynamically assigned for retransmissions, thus requiring signaling for transmitting ACK/NACK to request transmission and retransmission of the assignment information. The asynchronous type of HARQ may be an assignment method for assigning retransmission opportunities after a predefined amount of time from the timing of initial transmission, for example, at an arbitrary timing after at least a predefined amount of time from the transmission of ACK/NACK from the receiving side.

Also, if a synchronous type of HARQ is applied, for example, the assignment for retransmissions is fixed. As a result, signaling for the assignment information is unnecessary, but signaling for ACK/NACK to request retransmission is necessary. The synchronous type of HARQ is an assignment method for assigning retransmission opportunities after a predefined amount of time from timing of initial retransmission, for example, at an arbitrary timing after at least a predefined amount of time from transmission of ACK/NACK from the receiving side.

In the mobile communication system according to this embodiment, a predefined number of transmissions are performed to achieve the temporal diversity effect without application of the HARQ.

In this case, the same data may be transmitted twice, or a channel encoded data sequence may be mapped over multiple subframes.

Figure 3:
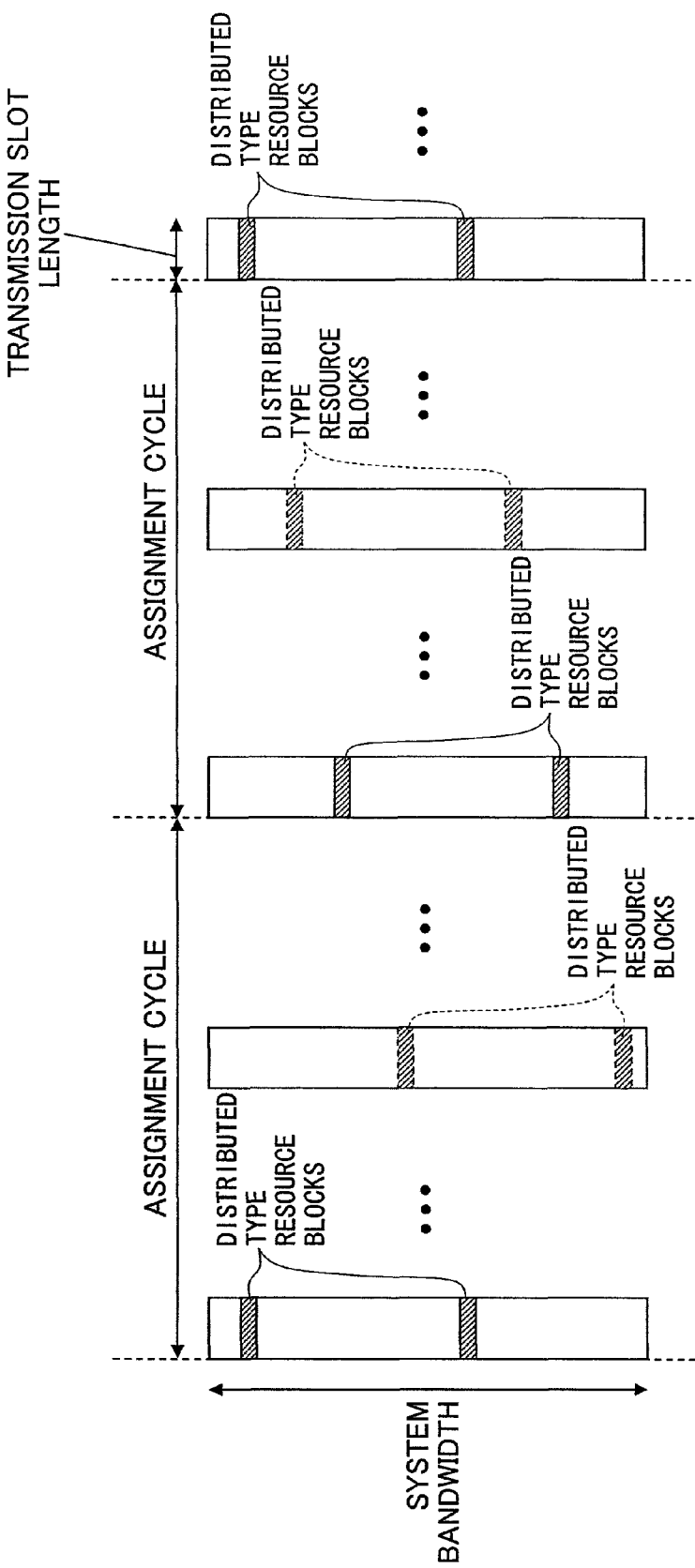
FIG. 3 is a schematic diagram illustrating a downlink transmission method according to one embodiment of the present invention.

FIG. 3 illustrates an exemplary transmission method for downlinks. In this embodiment, a channel encoded data sequence is mapped over multiple subframes, for example, over two subframes. In this case, multiple distributed type resource blocks, for example, two distributed type resource blocks are used for each of the two transmissions. Thus, one encoded data sequence is divided into four subframes for assignment.

Since the encoded data sequence is divided into two subframes and transmitted, the temporal diversity effect can be achieved, resulting in reduction in reception errors. There may be a problem that decoding cannot be initiated until completion of two receptions. However, in the case where the assignment cycle is 20 ms and the transmission interval of the same data is 10 ms, the resulting delay may be about 10 ms, which would be acceptable.

Figure 4:
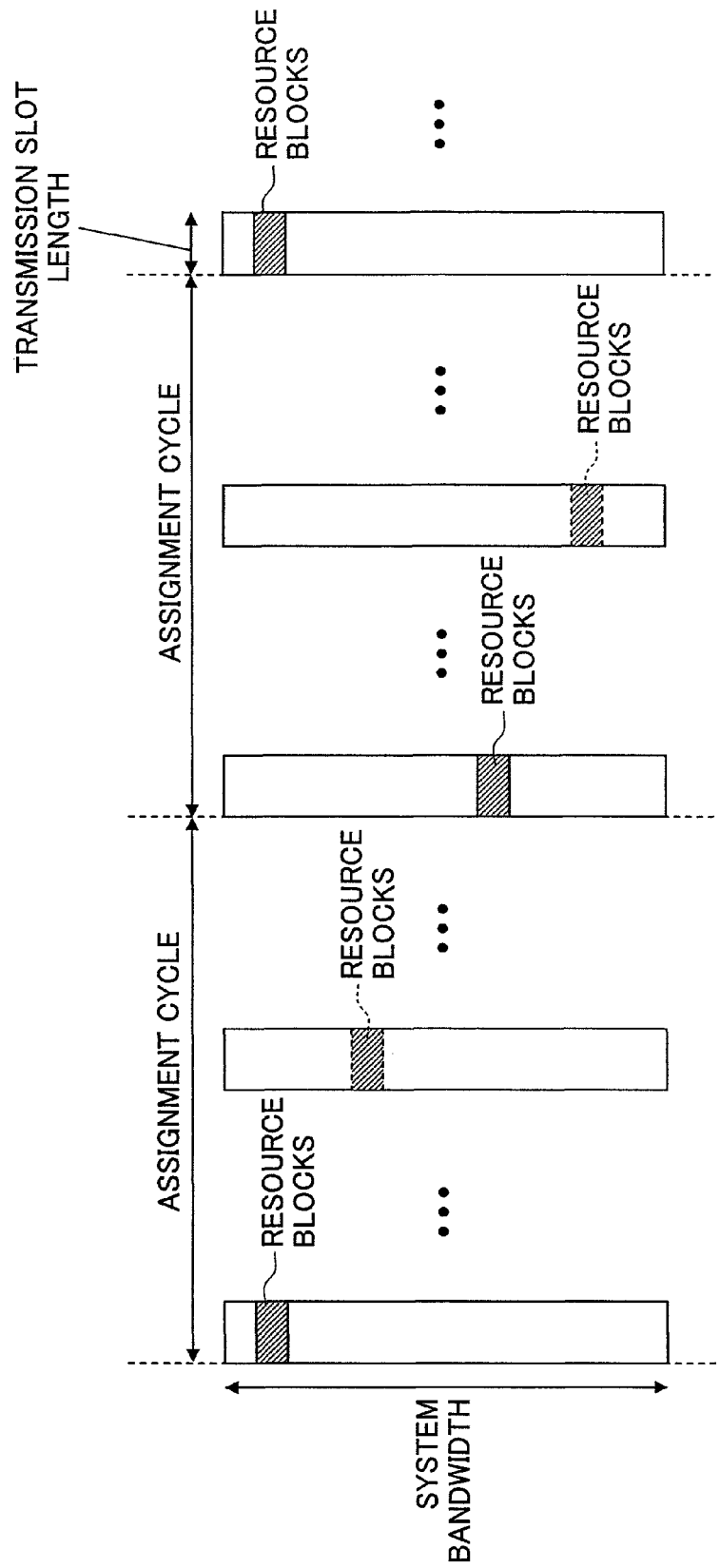
FIG. 4 is a schematic diagram illustrating an uplink transmission method according to one embodiment of the present invention.

FIG. 4 illustrates an exemplary transmission method for uplinks. Also in this embodiment, a channel encoded data sequence is mapped over multiple subframes, for example, two subframes. Specifically, since the encoded data sequence is divided into the two subframes and transmitted, the temporal diversity effect can be achieved, resulting in reduction in reception errors. There may be a problem that decoding cannot be initiated until completion of two receptions. However, in the case where the assignment cycle is 20 ms and the transmission interval of the same data is 10 ms, the resulting delay may be about 10 ms, which would be acceptable.

Also in the mobile communication system according to this embodiment, the AMC and TPC (Transmission Power Control) are applied to satisfy a required PER (Packet Error Rate).

In the application of the AMC, when the MCS (Modulation and Coding Scheme) being used is modified, that is, a combination of a modulation scheme and an error correction coding rate as determined by the base station 100 for each mobile station 200 based on reception quality and/or others measured by that mobile station 200, required radio resources such as the number of distributed type resource blocks may be changed. However, simultaneous use of the TPC may make assignment of the resource blocks unnecessary.

For example, the AMC control with a long cycle, for example, with a cycle longer than the assignment cycle such as hundreds of microseconds, may be combined with the assignment cycle based TPC. In this case, the AMC and the assignment of resource blocks are infrequently modified, and thus upper layer signaling is used to transmit the modification. This signaling may occur if the reception state varies. Also, the L1/L2 control signaling may be used similar to signaling to a user other than users subjected to the persistent scheduling. If the L1/L2 control signaling is used, it is necessary to reserve radio resources in advance.

Also, in the mobile communication system according to this embodiment, the persistent scheduling is applied to the mobile station 200.

In this case, feedback on the reception channel state from the base station 100 to the mobile station 200, that is, information indicative of a transmission bandwidth of a pilot channel for measurement of the reception channel state as determined to be assigned (downlink), and transmission of a pilot signal for measurement of the reception channel state from the mobile station 200 to the base station 100 (uplink) have cycles longer than the assignment cycle. Specifically, these cycles may be longer than the assignment cycle of a data channel.

In the downlink persistent scheduling, the feedback information of the reception channel state is transmitted in a transmission method as follows. Specifically, the base station 100 performs the persistent scheduling based on the feedback information of the reception channel state from the mobile station 200. The mobile station 200 uses an uplink to feed back the average reception state over a reception band at a constant cycle. This cycle is made longer than the assignment cycle of an actual data channel.

The mobile station 200 transmits the reception channel state in a RACH (Random Access Channel). In other words, the mobile station 200 transmits the reception channel state in signaling in an upper layer (L3). Also, for the transmission of the reception channel state, the mobile station 200 may use a radio resource as determined for time and frequency periodically assigned in advance. In this case, the radio resource used for transmission is specified and reported at start time of communication where the persistent scheduling is applied. Also in the case where MCS is switched, the radio resource is specified again.

In the uplink persistent scheduling, the reception channel state measurement signal is transmitted in a transmission method as follows. Specifically, the mobile station 200 transmits a pilot signal to measure an uplink reception channel state to the base station 100. The base station 100 uses the pilot signal transmitted from the mobile station 200 to measure the uplink reception state.

The base station 100 transmits the uplink reception channel state in the above-stated distributed transmission scheme and information indicative of a transmission bandwidth of a data channel in a distributed type resource block, that is, a transmission bandwidth equal to a frequency bandwidth for frequency scheduling. Also, they may be transmitted in an assigned band in a localized transmission. The localized transmission is a transmission method for assigning each user a resource block resulting in division of a system bandwidth into blocks of consecutive frequency subcarriers. In this case, if the mobile station 200 is located far away from the base station 100 and thus transmission must be performed with a greater band, the localized transmission may be performed in several times, that is, in two or more times. In other words, two or more transmission slots may be assigned for the transmission.

Next, an exemplary release of resource blocks in the downlink persistent scheduling is described.

As illustrated in FIG. 5, if the base station 100 does not have data to be transmitted to a user of interest, the base station 100 releases a resource block or a distributed type resource block assigned under the persistent scheduling and reassigns it to other users. In other words, if the base station 100 has data to be transmitted to the target user, the base station 100 assigns a resource block or a distributed type frequency block, and otherwise, the base station 100 releases the resource block or the distributed type frequency block to be assigned and reassigns it to other users.

Data transmitted from the base station 100 may include CRC overlapped with UE-ID. The mobile station 200 detects the CRC overlapped with the UE-ID from the transmitted data. Thus, if the resource block or the distributed resource block is assigned to another user, an error would be detected through CRC checking because of incompatibility of the UE-ID overlapped with the CRC. In this manner, the mobile station 200 can determine whether the transmitted data targets itself. Here, if retransmission control is enabled, the user terminal (mobile station 200) transmits NACK as a retransmission request but the base station 100 would ignore the request.

Next, exemplary release of resource blocks in the uplink persistent scheduling is described.

Unlike the above-mentioned downlinks, in uplinks, the mobile station 200 transmits the presence of transmission data to the base station 100 in order to release resource blocks assigned in the persistent scheduling.

Three methods as described in detail below are available as methods for reporting the presence of transmission data to the base station 100.

As illustrated in FIG. 6A, if transmission data is present, the mobile station 200 reports it to the base station 100 (Assign Request Base). For example, in a predefined cycle such as the assignment cycle, if transmission data is present, an assign request for requesting assignment of resource blocks is transmitted.

Figure 6B:
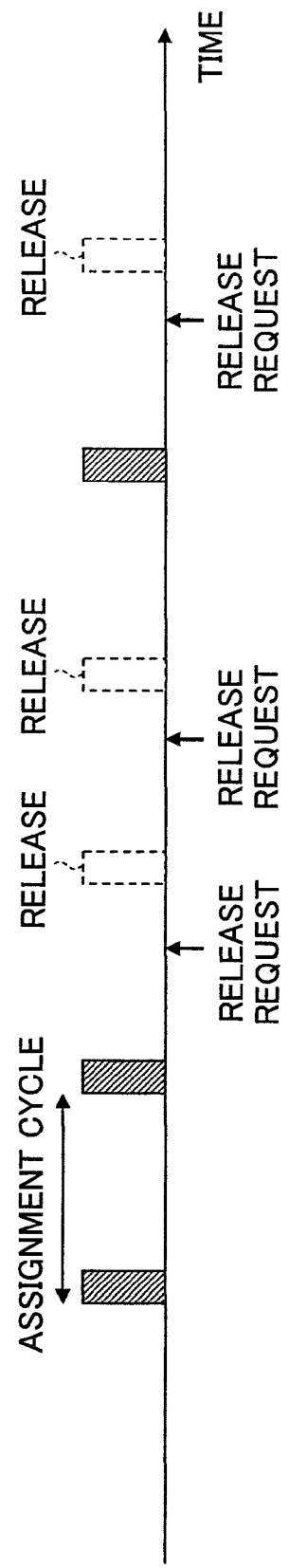
FIG. 6B is a schematic diagram illustrating release of resource blocks in an uplink according to one embodiment of the present invention.

Also, as illustrated in FIG. 6B, if no transmission data is present, the mobile station reports it to the base station 100 (Release Request Base). For example, in a predefined cycle such as the assignment cycle, if no transmission data is present, a release request for requesting release of resource blocks is transmitted.

As illustrated in FIG. 6C, if transmission data occurs or if transmission data no longer remains, the base station 100 is informed (combination of assign and release request). For example, in a predefined cycle such as the assignment cycle, if transmission data is present, the mobile station 200 transmits an assign request for assignment of resource blocks, and otherwise if no transmission data is present, the mobile station 200 transmits a release request for release of resource blocks.

Also, these reporting signals are transmitted in RACH. In other words, they are transmitted under signaling of an upper layer (L3). Also, radio resources periodically assigned in advance and determined for time and frequency may be used to transmit the reporting signals. In this case, exclusive assignment of the radio resources enables orthogonalization among users, resulting in improved reception quality. Alternatively, although radio resources are statically assigned in advance, the reporting signals may be multiplexed in CDMA (Code Division Multiple Access) among a smaller number of users.

Next, exemplary assignment timings of transmissions of data and control information are described.

In audio services, it is assumed that radio resources are statically assigned in uplinks and downlinks. In such a case, efficient communications of control information can be achieved by optimizing timing of static assignment of the radio resources in uplinks and downlinks including assignment of the radio resources for transmission of control information.

Radio resources for transmitting reception channel state in the downlinks, presence of uplink transmission data and ACK/NACK to the downlink data transmission are assigned immediately before the downlink transmission. In this manner, the downlink reception channel state can be reflected in link adaptation of the downlink transmission. Also, the transmission of presence of the uplink data enables empty uplink radio resources to be reassigned to other users. In this case, the resulting reassignment is transmitted simultaneously with the downlink data transmission.

Radio resources for the uplink data transmission are assigned after the downlink data transmission. In this manner, if the radio resources for the uplink data transmission are released, the resulting reassignment can be reported to assigned users. ACK/NACK to the downlink data transmission together with the uplink data transmission may be transmitted.

Figure 7A:
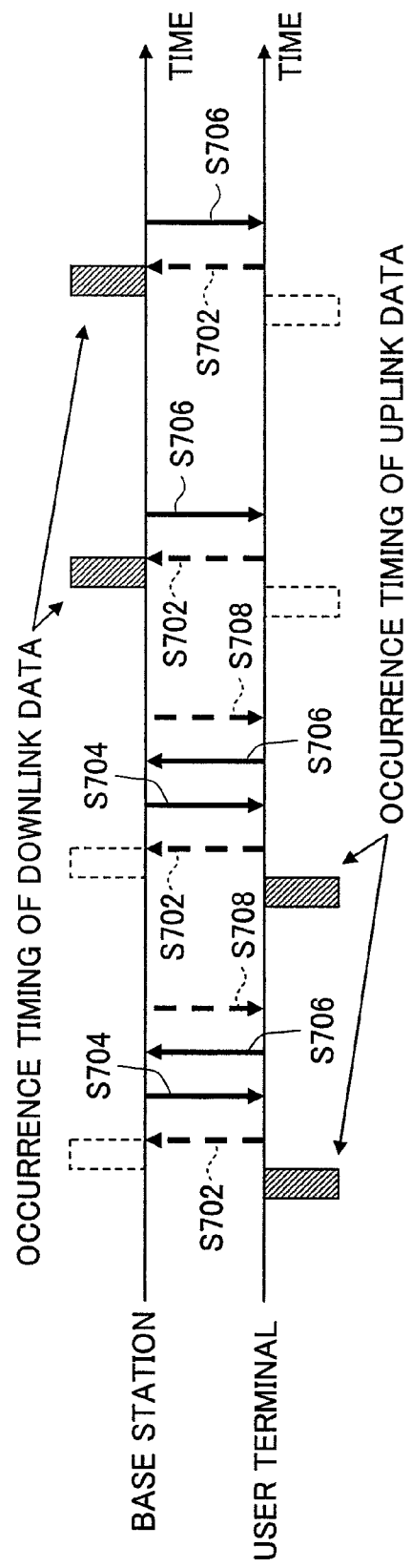
FIG. 7A is a schematic diagram illustrating transmission timings of data and control information according to one embodiment of the present invention.

Exemplary specific assignment timing of transmissions of data and control information is described with reference to FIGS. 7A and 7B.

A case where uplink data occurs is described.

At step S702, a user terminal (mobile station 200) transmits one or more of feedback of downlink reception channel state, an assign request or a release request, and ACK/NACK to downlink data transmission. In this case where uplink data occurs, an assign request is transmitted.

At step S704, the base station 100 performs link adaptation or AMC based on the downlink reception channel state transmitted in an uplink and transmits downlink data based on results of the link adaptation. Also, if a release request is transmitted from the user terminal, the base station 100 transmits mapping information within subframes of the downlink data to users other than users subjected to the persistent scheduling. In addition, the base station 100 transmits assignment information for the uplink transmission. If radio resources for the users subjected to the persistent scheduling are released, these radio resources are assigned to the users other than the users subjected to the persistent scheduling.

At step S706, the user terminal transmits the uplink data. Here, the user terminal may transmit ACK/NACK responding to the downlink data transmission simultaneously.

At step S708, the base station 100 transmits ACK/NACK responding to the downlink data transmission.

A case where downlink data occurs is described.

In this case, the above-mentioned steps S702 and S704 are performed.

Specifically, at step S702, a user terminal (mobile station 200) transmits one or more of feedback of the downlink reception channel state and an assign request or a release request.

Then, the base station 100 performs link adaptation based on the downlink reception channel state transmitted in an uplink and transmits downlink data based on results of the link adaptation.

At step S704, the base station 100 transmits mapping information of subframes for the downlink data to users other than users subjected to the persistent scheduling. In addition, the base station 100 transmits assignment information on uplink transmission. If radio resources for the users subjected to the persistent scheduling are released, the radio resources are assigned to the users other than the users subjected to the persistent scheduling.

Next, exemplary arrangements of the base station 100 and the mobile station 200 realizing the above-mentioned mobile communication system are described below. In the following embodiments, the base station 100 and the mobile station 200 to which the persistent scheduling is applied in downlinks and the base station 100 and the mobile station 200 to which the persistent scheduling is applied in uplinks are separately described, but the base station and the mobile station 200 may be arranged to have both of the functions.

Figure 8:
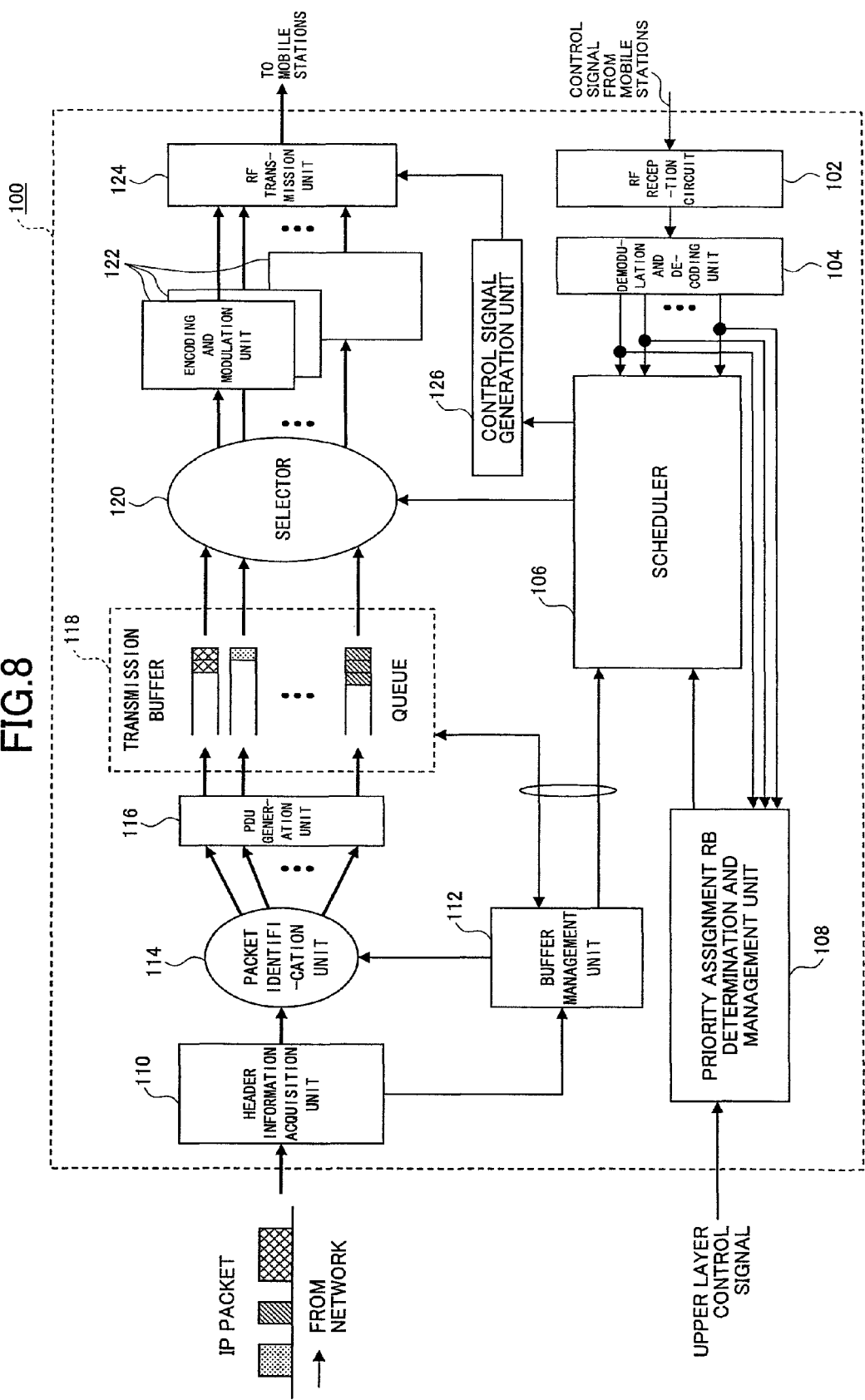
FIG. 8 is a partial block diagram illustrating a base station according to one embodiment of the present invention.
Figure 9:
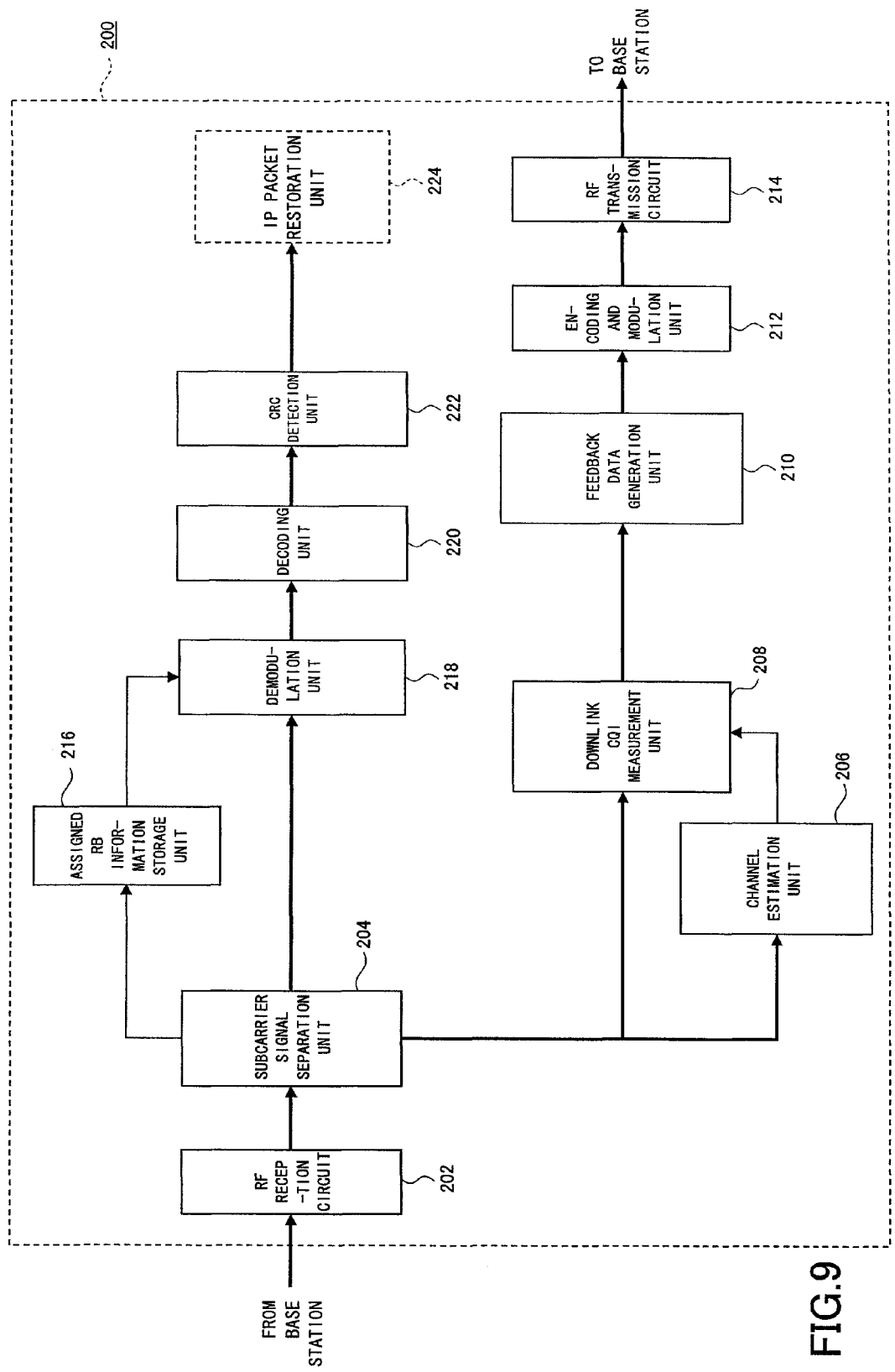
FIG. 9 is a partial block diagram illustrating a mobile station according to one embodiment of the present invention.

The base station 100 and the mobile station 200 to which the persistent scheduling is applied in downlinks are described with reference to FIGS. 8 and 9.

The base station 100 includes a RF reception circuit 102, a demodulation and decoding unit 104 coupled to the RF reception circuit 102, a scheduler 106 coupled to the demodulation and decoding unit 104, a priority assignment resource block determination and management unit 108 coupled to the scheduler 106 and the demodulation and decoding unit 104, a header information acquisition unit 110, a packet identification unit 114 coupled to the header information acquisition unit 110, a buffer management unit 112 coupled to the header information acquisition unit 110, the packet identification unit 114 and the scheduler 106, a PDU (Protocol Data Unit) generation unit 116 coupled to the packet identification unit 114, a transmission buffer 118 coupled to the PDU generation unit 116 and the buffer management unit 112, a selector 120 coupled to the transmission buffer 118 and the scheduler 106, an encoding and modulation unit 122 coupled to the selector 120 for serving as one or more encoding and modulation means, a RF transmission unit 124 coupled to the encoding and modulation unit 122 for serving as transmission power control means, and a control signal generation unit 126 coupled to the RF transmission unit 124 and the scheduler 106.

The RF reception circuit 102 receives control signals including control information from mobile stations 200 and supplies the received control signals to the demodulation and decoding unit 104. The demodulation and decoding unit 104 demodulates and decodes the control signals. The scheduler 106 transmits uplink control information (downlink reception channel states of respective resource blocks) of the mobile stations 200 such as downlink CQIs (Channel Quality Indicators) of the respective resource blocks for the user terminals.

Also, if the mobile station 200 feeds back the reception channel states by signaling in an upper layer, control signals for that upper layer are supplied to the priority assignment resource block determination and management unit 108. The priority assignment resource block determination and management unit 108 determines a resource block to be assigned by priority and supplies it to the scheduler 106.

Upon receiving an IP packet from a network, the header information acquisition unit 110 acquires packet header information such as a destination address from the received IP packet and transmits the acquired packet header information to the buffer management unit 112. The IP packet is supplied to the packet identification unit 114.

The buffer management unit 112 specifies a storage location for the packet data to the packet identification unit 114 based on the transmitted packet header information and states of respective queues transmitted from the transmission buffer 118 as described below. Also, the buffer management unit 112 supplies the destination address and a memory address of a queue corresponding to the destination address to the transmission buffer 118. The buffer management unit 112 informs the scheduler 106 of the packet header information and the respective states of the queues transmitted from the transmission buffer 118.

The packet identification unit 114 identifies the incoming IP packets based on the storage location of the packet data specified by the buffer management unit 112 and supplies the identified packets to the PDU generation unit 116 separately. The PDU generation unit 116 converts the supplied packets into PDUs and supplies them to the transmission buffer 118.

The transmission buffer 118 generates a queue specific to each destination (mobile station 200) from the supplied PDUs and transmits the state of queues to the buffer management unit 112.

The selector 120 extracts data from the queue indicated by the scheduler 106 and supplies it to the encoding and modulation unit 122 associated with the indicated resource block. This resource block is assigned by the scheduler 106.

The scheduler 106 derives measures (priority measures) for assignment of resource blocks to users based on the resource blocks assigned by priority, the packet header information and the respective states of queues that are determined based on the transmitted uplink control information (downlink reception channel states of frequency blocks) of the mobile stations 200 and/or the control signals transmitted from the upper layer. Then, the scheduler 106 determines the assignment of the resource blocks based on the measures. Specifically, the scheduler 106 may assign either resource blocks resulting from division of a system bandwidth into blocks of consecutive frequency subcarriers or distributed resource blocks consisting of frequency subcarriers discretely distributed in the system bandwidth and resulting from segmentation of the resource blocks.

Also, as mentioned above, the scheduler 106 adaptively adjusts modulation schemes and/or error correction coding rates depending on variations of propagation environment. Specifically, the scheduler 106 modifies MCSs in use, that is, combinations of the modulation schemes and the error correction coding rates of transmission data determined for each mobile station 200. Information indicative of a combination of the modified modulation scheme and error correction coding rate of the transmission data is supplied to the control signal generation unit 126. The control signal generation unit 126 generates a control signal indicative of the supplied modulation scheme and error correction coding rate of the transmission data and transmits the control signal via the RF transmission unit 124. Also, the scheduler 106 specifies a predefined and fixed number of transmission.

The encoding and modulation unit 122 encodes and modulates the supplied data based on the determined MCS and supplies the encoded and modulated data to the mobile stations 200 under transmission power control by the RF transmission unit 124. For example, the MCS is modified at a cycle longer than the assignment cycle, and the transmission power is modified at the assignment cycle.

The mobile station 200 includes a RF reception circuit 202, a subcarrier signal separation unit 204 coupled to the RF reception circuit 202, a channel estimation unit 206 coupled to the subcarrier signal separation unit 204, a downlink CQI measurement unit 208 coupled to the subcarrier signal separation unit 204 and the channel estimation unit 206, a feedback data generation unit 210 coupled to the downlink CQI measurement unit 208, an encoding and modulation unit 212 coupled to the feedback data generation unit 210, a RF transmission unit 214 coupled to the encoding and modulation unit 212, an assigned resource block information storage unit 216 coupled to the subcarrier signal separation unit 204, a demodulation unit 218 coupled to the subcarrier signal separation unit 204 and the assigned resource block information storage unit 216, a decoding unit 220 coupled to the demodulation unit 218, a CRC detection unit 222 coupled to the decoding unit 220, and an IP packet restoration unit 224 coupled to the CRC detection unit 222.

Then RF reception circuit 202 receives a pilot channel from the base station 100. The RF reception circuit 202 supplies the pilot channel to the subcarrier signal separation unit 204. The subcarrier signal separation unit 204 separates individual subcarrier signals from the pilot channel and supplies each of the separated individual subcarrier signals to the channel estimation unit 206 and the downlink CQI measurement unit 208.

The channel estimation unit 206 uses a pilot symbol to derive channel estimation values for the subcarriers and supplies the channel estimation values to the downlink CQI measurement unit 208. The downlink CQI measurement unit 208 measures an average CQI over a transmission band of the pilot channel and supplies the measured average CQI to the feedback data generation unit 210. The feedback data generation unit 210 generates feedback information (control information) indicative of a reception channel state of a downlink as feedback information to the base station based on the supplied CQI and supplies the feedback information to the encoding and modulation unit 212. The encoding and modulation unit 212 encodes and modulates the feedback information and uses the RF transmission circuit 214 to transmit the encoded and modulated feedback information to the base station 100. For example, a radio resource for transmitting the downlink reception channel state is assigned immediately before downlink transmission.

Also, the RF reception circuit 202 receives signals transmitted from the base station 100. The RF reception circuit 202 supplies the received signals to the subcarrier signal separation unit 204. The subcarrier signal separation unit 204 separates individual subcarrier signals from the received signal and supplies each of the separated individual subcarrier signals to the demodulation unit 218.

The demodulation unit 218 demodulates the supplied individual subcarrier signals based on assigned resource block information stored in the assigned resource block information storage unit 216 and supplies each of the demodulated signals to the decoding unit 220. In this embodiment, the assigned resource block information may include a control channel transmitted from the base station 100, for example, a L1/L2 control channel. Also, the assigned resource block information may include MCS information, for example.

The decoding unit 220 decodes the supplied signals and supplies the decoded signals to the CRC detection unit 222. The CRC detection unit 222 detects a CRC overlapped with a UE-ID included in the transmission data for error detection and determines whether the transmission data is destined for the mobile station 200. If the transmission data is destined for the mobile station 200, the CRC detection unit 222 supplies the transmission data to the IP packet restoration unit 224. The IP packet restoration unit 224 restores the supplied transmission data.

Figure 10:
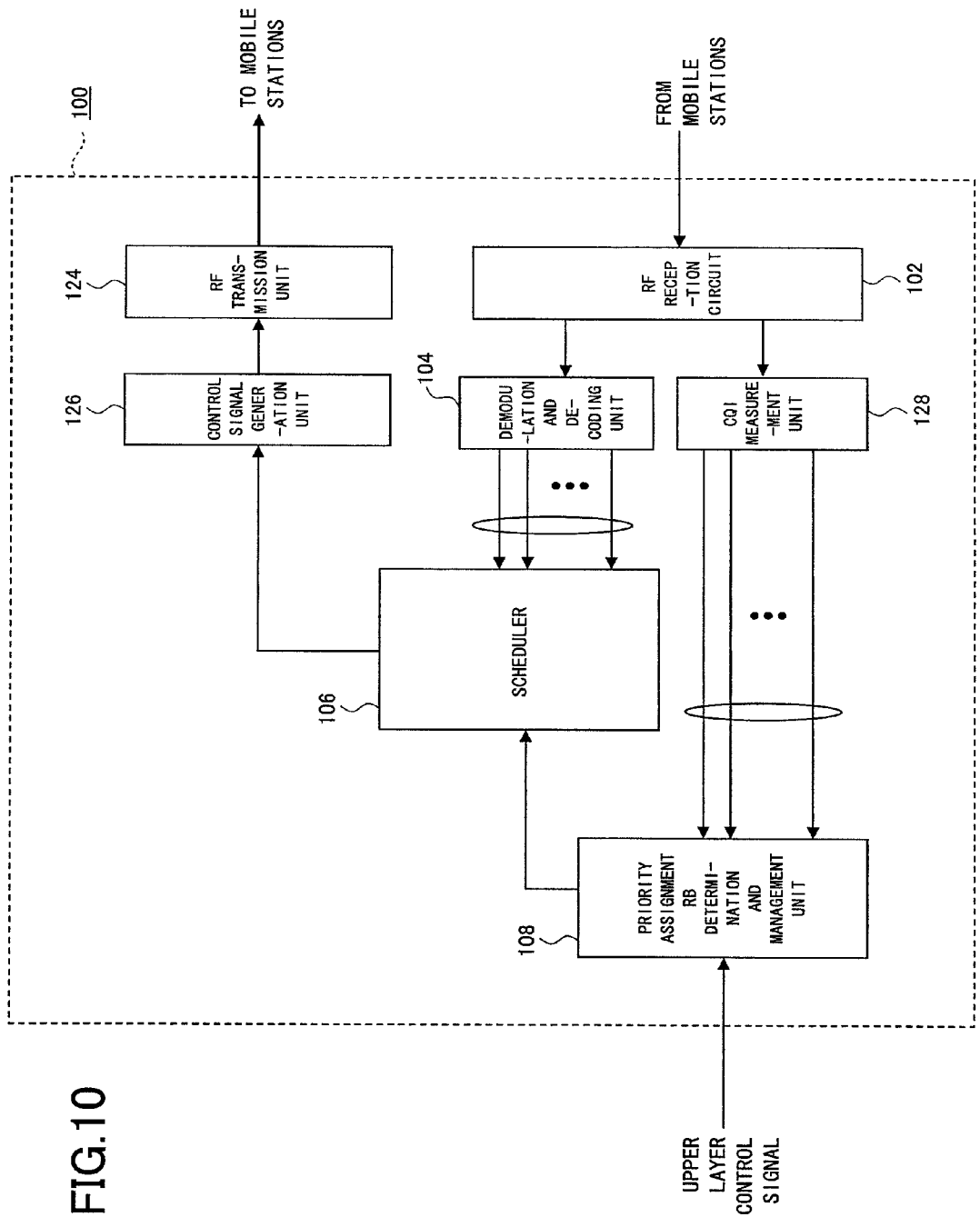
FIG. 10 is a partial block diagram illustrating a base station according to one embodiment of the present invention.
Figure 11:
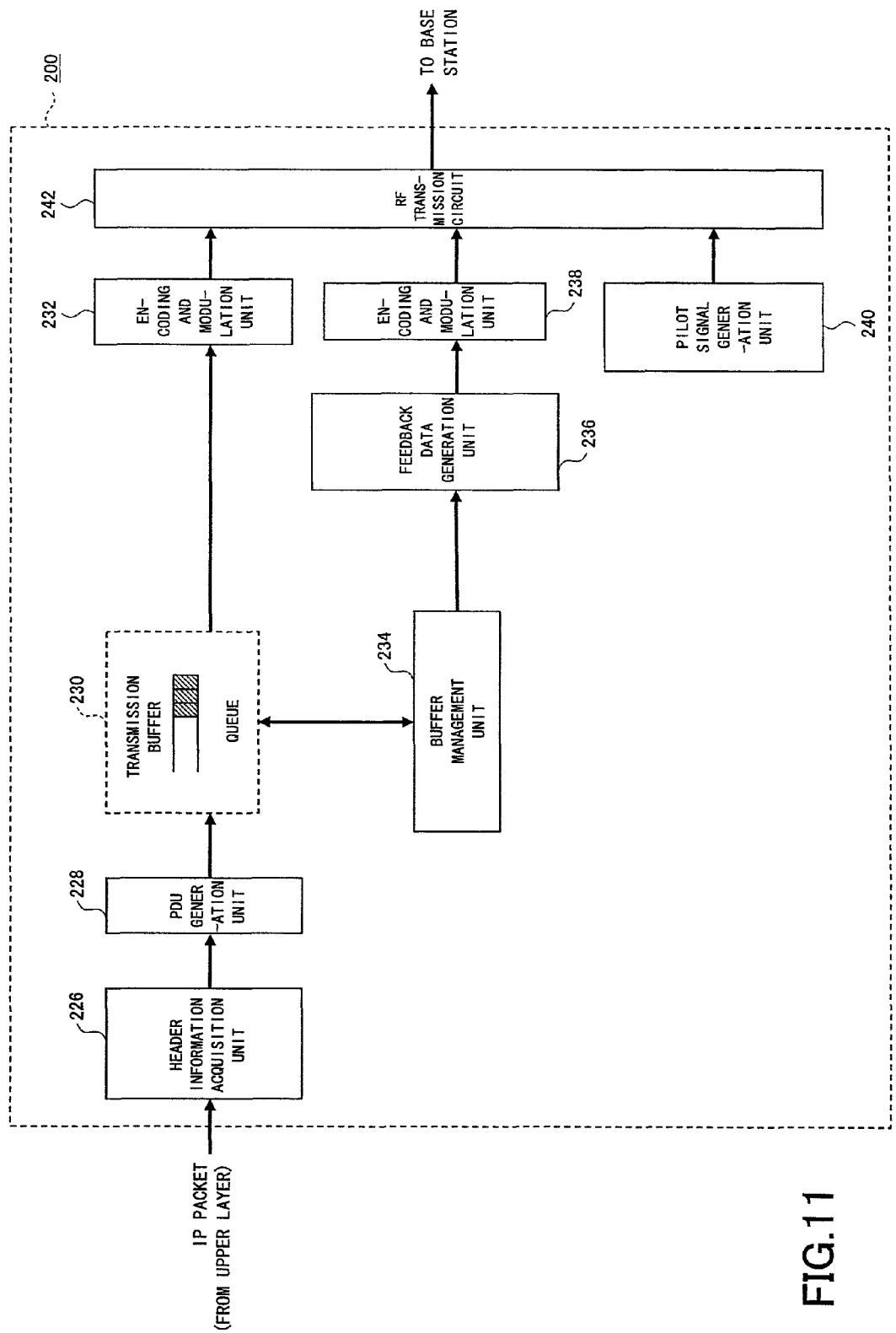
FIG. 11 is a partial block diagram illustrating a mobile station according to one embodiment of the present invention.

Next, the base station 100 and the mobile station 200 to which the persistent scheduling is applied in uplinks are described with reference to FIGS. 10 and 11.

The base station 100 includes a RF reception circuit 102, a demodulation and decoding unit 104 and a CQI measurement unit 128 coupled to the RF reception circuit 102, a scheduler 106 coupled to the demodulation and decoding unit 104, a priority assignment resource block determination and management unit 108 coupled to the scheduler 106 and the CQI measurement unit 128, a control signal generation unit 126 coupled to the scheduler 106, and a RF transmission unit 124 coupled to the control signal generation unit 126.

The scheduler 106 assigns a transmission band of a pilot channel for measuring an uplink reception channel state to the mobile station 200 at a cycle longer than assignment cycle of a data channel. Information indicative of the assignment of the transmission band is supplied to the control signal generation unit 126 and transmitted via the RF transmission unit 124.

The mobile stations 200 transmit signals for measuring the respective reception channel states to the base station 100 in the assigned transmission band of the pilot channel. The RF reception circuit 102 receives the signals for measuring the reception channel states and supplies the received pilot signals for measuring the reception channel states to the CQI measurement unit 128. The CQI measurement unit 128 measures reception quality such as a CQI and supplies information on the measured reception quality together with the signals for measuring the reception channel states to the priority assignment resource block determination and management unit 108. Also, the RF reception circuit 102 receives information indicative of presence of transmission data in the mobile stations 200 and supplies the information to the priority assignment resource block determination and management unit 108 via the CQI measurement unit 128.

Also, the presence of transmission data in the mobile station 200 may be transmitted in a control signal of an upper layer. In this case, the upper layer control signal is supplied to the priority assignment resource block determination and management unit 108.

The priority assignment resource block determination and management unit 108 determines which resource block is to be assigned by priority, that is, which resource block is to be subjected to the persistent scheduling, based on the reception quality of the pilot channel for measuring the reception channel state, the upper layer control signal and the presence of transmission data in the mobile station 200 and supplies the resource block to the scheduler 106.

The scheduler 106 determines the assignment of resource blocks based on the resource block assigned by priority as determined by the priority assignment resource block determination and management unit 108 and supplies the assignment information of the determined resource block to the control signal generation unit 126. The control signal generation unit 126 generates assignment information of an uplink transmission band based on the assignment information of the resource block as determined by the scheduler 106, that is, a transmission bandwidth of a data channel, and supplies the assignment information to the RF transmission unit 124. The RF transmission unit 124 transmits a control signal supplied from the control signal generation unit 126 to the mobile stations 200. As a result, the assignment information on uplink transmission can be transmitted from the base station 100 to the mobile stations 200.

For example, radio resources for the uplink data transmission may be assigned after downlink data transmission. In other embodiments, the scheduler 106 may determine different combinations of modulation schemes and error correction coding rates of transmission data for the mobile stations 200 at a cycle longer than the assignment cycle and transmit the determined combinations of modulation schemes and error correction coding rates as control information.

Also, the RF reception circuit 102 receives transmission data from the mobile station 200 and supplies the transmission data to the demodulation and decoding unit 104. The demodulation and decoding unit 104 demodulates and decodes the supplied transmission data. The demodulation and decoding unit 104 transmits uplink CQIs of individual resource blocks for each user terminal to the scheduler 106.

The scheduler 106 determines the reassignment of resource blocks at a predefined assignment cycle based on the CQIs supplied from the demodulation and decoding unit 104 and supplies the determined assignment information of the resource blocks to the control signal generation unit 126. The control signal generation unit 126 generates assignment information on an uplink transmission band based on the assignment information of the resource blocks as determined by the scheduler 106 and supplies the assignment information to the RF transmission unit 124. The RF transmission unit 124 transmits a control signal supplied from the control signal generation unit 126 to the mobile stations 200. For example, this reassignment information may be transmitted simultaneously with downlink data transmission.

The mobile station 200 includes a header information acquisition unit 226, a PDU generation unit 228 coupled to the header information acquisition unit 226, a transmission buffer 230 coupled to the PDU generation unit 228, an encoding and modulation unit 232 and a buffer management unit 234 coupled to the transmission buffer 230, a feedback data generation unit 236 coupled to the buffer management unit 234, an encoding and modulation unit 238 coupled to the feedback data generation unit 236, a pilot signal generation unit 240, and a RF transmission circuit 242 coupled to the encoding and modulation units 232, 238 and the pilot signal generation unit 240.

The pilot signal generation circuit 240 generates a pilot signal for measuring a reception channel state of an uplink based on information indicative of a transmission band of a pilot channel for measuring the reception channel state of the uplink transmitted from the base station 100 and transmits the pilot signal via the RF transmission circuit 242.

IP packets from an upper layer are supplied to the header information acquisition unit 226. The header information acquisition unit 226 acquires packet header information such as a destination address from the received IP packets and transmits the acquired packet header information to the buffer management unit 234 as well as supplies the IP packets to the PDU generation unit 228.

The PDU generation unit 228 converts the supplied packets into PDUs and supplies the PDUs to the transmission buffer 230. The transmission buffer 230 arranges a queue for a destination (base station 100) from the supplied PDUs based on the destination address supplied from the buffer management unit 112 and a memory address of the corresponding queue and supplies status of the queue to the buffer management unit 234.

The buffer management unit 234 is informed by the base station 100 of information indicative of an assigned data channel transmission band. In addition, respective combinations of transmission data modulation schemes and error correction coding rates as determined for different mobile stations 200 are reported.

The transmission buffer 230 retrieves data from the queue based on the uplink transmission assignment information specified by the buffer management unit 234, that is, information indicative of assigned data channel transmission band and supplies the data to the encoding and modulation unit 232. The encoding and modulation unit 232 performs encoding and modulation based on the combination of transmission data modulation scheme and error correction coding rate determined for the mobile station 200 and supplies the result to the RF transmission circuit 242. The RF transmission circuit 242 transmits transmission data under transmission power control.

The buffer management unit 234 supplies the destination address and the memory address of the queue associated with the destination address to the transmission buffer 230. Also, the buffer management unit 234 transmits status of the queue transmitted from the transmission buffer 230 and the packet header information to the feedback data generation unit 236. The feedback data generation unit 236 generates feedback information indicative of presence of transmission data based on the supplied status of the queue and supplies the feedback information to the encoding and modulation unit 238. The encoding and modulation unit 238 transmits the supplied feedback information to the base station 100 via the RF transmission circuit 242.

For convenience, the present invention has been described with reference to the distinct embodiments, but separation of the embodiments is not essential to the present invention and two or more of the embodiments may be used together as needed. Some specific numerals have been used to facilitate understanding of the present invention, but unless otherwise noted, these numerals are simply illustrative and any other appropriate values may be used.

The present invention has been described with reference to the specific embodiments of the present invention, but the embodiments are simply illustrative and variations, modifications, alterations and substitutions could be contrived by those skilled in the art. For convenience of explanation, apparatuses according to the embodiments of the present invention have been described with reference to functional block diagrams, but these apparatuses may be implemented in hardware, software or combinations thereof. The present invention is not limited to the above embodiments, and variations, modifications, alterations and substitutions can be made by those skilled in the art without deviating from the spirit of the present invention.

This international patent application is based on Japanese Priority Application No. 2006-225927 filed on Aug. 22, 2006, the entire contents of which are hereby incorporated by reference.

INDUSTRIAL APPLICABILITY

A base station and a mobile station according to the present invention can be applied to a radio communication system.

The invention claimed is:
1. A base station, comprising:
a pilot channel transmission band assignment unit configured to assign a transmission band of a pilot channel to measure an uplink reception channel state at a cycle longer than an assignment cycle of a data channel;
a data channel transmission band assignment unit configured to assign resource blocks as a transmission band of the data channel to mobile stations, the resource blocks resulting from division of a system bandwidth into blocks of consecutive frequency subcarriers;
a control information generation unit configured to generate a control signal to inform the mobile stations of a bandwidth of the transmission band of the pilot channel assigned by the pilot channel transmission band assignment unit and a bandwidth of the transmission band of the data channel assigned by the data channel transmission band assignment unit; and a signaling unit configured to transmit the control signal generated by the control information generation unit to the mobile stations, wherein the data channel transmission band assignment unit assigns the transmission band of the data channel based on reception quality of a reception channel state measuring pilot channel transmitted in the transmission band of the pilot channel assigned by the pilot channel transmission band assignment unit.

2. A mobile station, comprising:

a pilot signal generation unit configured to generate a pilot channel to be transmitted to a base station at a cycle longer than an assignment cycle of a data channel;

a transmission data assignment unit configured to assign transmission data to a resource block assigned by the base station based on the pilot channel at an assignment cycle of the data channel; and a transmission unit configured to transmit the pilot channel generated by the pilot signal generation unit and the transmission data assigned by the transmission data assignment unit, wherein the transmission unit transmits the pilot channel by using a transmission band of an uplink reception channel state measuring pilot channel assigned by the base station.

3. The mobile station as claimed in claim 2, wherein the transmission data assignment unit assigns the transmission data to resource blocks switched for each transmission slot assigned by the base station, and the base station switches the resource blocks assigned to the transmission slots.

4. The mobile station as claimed in claim 2, wherein the transmission data assignment unit assigns the transmission data to different resource blocks for different assignment cycles of the data channel assigned by the base station, and the base station assigns different resource blocks to the different assignment cycles of the data channel.

5. The mobile station as claimed in claim 2, wherein the transmission data assignment unit assigns the transmission data to a predefined number of transmission slots assigned by the base station within the assignment cycle of the data channel, and the base station assigns the predefined number of transmission slots within the assignment cycle of the data channel.

6. The mobile station as claimed in claim 2, further comprising:

an encoding and modulation unit configured to perform encoding and modulation based on a combination of a modulation scheme and an error correction coding rate of the transmission data signaled from the base station; and a transmission power control unit configured to control transmission power at the assignment cycle of the data channel, wherein the base station sets the combination of a modulation scheme and an error correction coding rate of transmission data for each mobile station at a cycle longer than the assignment cycle of the data channel based on an uplink reception channel state and signals the set combination of the modulation scheme and the error correction coding rate of the transmission data.

7. The mobile station as claimed in claim 2, further comprising:

a signaling unit configured to signal information indicative of a presence of transmission data to the base station.

* * * * *